(12) United States Patent
Wong

(10) Patent No.: US 7,418,439 B2
(45) Date of Patent: Aug. 26, 2008

(54) MIRROR FILE SYSTEM

(75) Inventor: John P. Wong, Fremont, CA (US)

(73) Assignee: Twin Peaks Software, Inc., Fremont, CA (US)

( * ) Notice: Subject to any disclaimer, the term of this patent is extended or adjusted under 35 U.S.C. 154(b) by 1179 days.

(21) Appl. No.: 09/810,246

(22) Filed: Mar. 19, 2001

(65) Prior Publication Data

US 2001/0051955 A1 Dec. 13, 2001

Related U.S. Application Data

(60) Provisional application No. 60/189,979, filed on Mar. 17, 2000.

(51) Int. Cl.
*G06F 17/30* (2006.01)
(52) U.S. Cl. .................... 707/2; 707/100; 707/200; 707/205
(58) Field of Classification Search ............... 707/1, 707/8, 204, 2, 100, 200, 205
See application file for complete search history.

(56) References Cited

U.S. PATENT DOCUMENTS

| | | | | |
|---|---|---|---|---|
| 5,435,004 | A * | 7/1995 | Cox et al. ................. | 707/205 |
| 5,544,347 | A * | 8/1996 | Yanai et al. ............... | 711/162 |
| 5,603,019 | A * | 2/1997 | Kish ........................ | 707/205 |
| 5,764,903 | A * | 6/1998 | Yu ........................... | 709/208 |
| 5,764,972 | A * | 6/1998 | Crouse et al. ............. | 707/1 |
| 5,778,384 | A * | 7/1998 | Provino et al. ............ | 707/200 |
| 5,870,734 | A * | 2/1999 | Kao ......................... | 707/2 |
| 5,873,085 | A * | 2/1999 | Enoki et al. .............. | 707/10 |
| 5,946,685 | A * | 8/1999 | Cramer et al. ............ | 707/10 |
| 6,000,020 | A * | 12/1999 | Chin et al. ............... | 711/162 |
| 6,115,741 | A * | 9/2000 | Domenikos et al. ...... | 709/217 |
| 6,192,408 | B1 * | 2/2001 | Vahalia et al. ........... | 709/229 |
| 6,216,140 | B1 * | 4/2001 | Kramer .................... | 715/511 |
| 6,298,390 | B1 * | 10/2001 | Matena et al. ........... | 719/315 |
| 6,366,988 | B1 * | 4/2002 | Skiba et al. .............. | 711/165 |
| 6,466,978 | B1 * | 10/2002 | Mukherjee et al. ....... | 709/225 |
| 6,625,750 | B1 * | 9/2003 | Duso et al. ............... | 714/11 |
| 6,697,846 | B1 * | 2/2004 | Soltis ...................... | 709/217 |

OTHER PUBLICATIONS

Veritas User Manual, File Replicator™ 3.0.1 for *Solaris®*, Jan. 2001, pp. 1-115.

* cited by examiner

*Primary Examiner*—Sana Al-Hashemi
(74) *Attorney, Agent, or Firm*—Buchanan Ingersoll & Rooney PC

(57) ABSTRACT

A mirror file systems (MFS) is a virtual file system that links two or more file systems together and mirrors between them in real time. The file systems linked and mirrored through the mirror file system can be a local file system connected to a physical device, or a network file system exported by a remote system on a network. The mirroring mechanism is established by linking a file system to another file system on a single directory through an MFS mounting protocol. User applications perform normal file system operation and file/directory operation system calls like open, read, write and close functions from the pathname of either file system. When updates occur, such as a write operation, the MFS mechanism ensures that all data updates go to both the file systems in real time.

18 Claims, 10 Drawing Sheets

MIRROR FILE SYSTEM

This application claims priority under 35 U.S.C. §§ 119 and/or 365 to 60/189,979 filed in the United States of America on 17 Mar. 2000; the entire content of which is hereby incorporated by reference.

BACKGROUND OF THE INVENTION

In a computer network environment, hundreds or even thousands of computer systems may be connected by a communication channel. They can all communicate with each other through many different communication protocols. Each protocol has a particular way to link the systems together to transmit data from one to another. To help the systems cooperate more closely, resource sharing mechanisms have been developed to allow computer systems to share files across the computer network. One example of such a mechanism is the client-server Network File System (NFS) developed by Sun Microsystems. By sharing the files across the network, every client system on the network can access the shared files as if the files were local files on the client system, although the files may be physically located on and managed by a network server system at a remote location on the network. The file sharing provided by the NFS enhances the network operation with the following features:
  a. Each client system no longer needs to physically keep a local copy of the files.
  b. Every client system can access the shared files in the same manner as it accesses its own local files.
  c. There is only one copy of files located on and managed by a network server, so it is always the only version and always up-to-date.

This file sharing provided by the NFS works well in a small or middle size network environment. As more client systems are added to the network, and more subnets are connected to the network, more routers and switches are needed to interconnect many different small networks or sub-networks to form a large network. A network server that shares its files across such a network to the client systems faces the following problems:
  1. The network server is loaded heavily by increasing requests from many client systems on the network. To alleviate the load problem, the network server can be upgraded to add more CPUs on the system, and the storage devices which store the shared information can also be upgraded to provide more bandwidth on their data channels, so that requests for the information from client systems on the network can be serviced without delays.
  2. The network is congested with the traffic generated by the client systems' requests from all different directions and the server's return. To alleviate the congestion problem, the bandwidth of network communications media can be increased to accommodate more traffic and faster routers and/or switches can be added to transfer data packets faster on the network.

By using more CPUs on the system, faster data channels on the storage media, increased network bandwidth, and adding faster routers and/or switches, the overloading problem on the network server and the traffic congestion problem on the network are reduced to some degree. But this single centralized network server configuration and topology still faces other problems:
  3. If the storage device that stores the shared files is not available due to a) power outage, b) hardware failure, or c) scheduled maintenance, then the network clients that depend on the network server to store and to retrieve critical information from the shared files on that storage device will not function properly. To reduce the risk from such disasters, a disk array technology known as RAID (Redundant Array of Independent Disks) was developed to minimize the damage and more easily recover from failure due to the above mentioned situations. The RAID disk array technology can protect the files on the disk from damage or corruption by using the techniques of striping, mirroring and parity checking, etc. But this only protects the storage system, and not the network server.
  4. If the network server goes down for any reason, it cannot store or retrieve critical information for the network clients. To deal with the problem caused when a network server goes down, the following two computer systems were designed:
      a. Fault-tolerant computer systems that require duplicate copies of every hardware component in the system as stand-by parts.
      b. Clustering systems which have more than one network server physically connected to the same storage system on which the shared files are located. All these network servers (or nodes) are running at the same time, but only one of them actually serves the clients' requests; the others function as stand-bys. When the primary server is down, a stand-by server kicks in and takes over the operation.

With more CPUs on the system, RAID disk arrays, fault-tolerant computer systems and clustering network systems, many of the problems that are associated with sharing files by means of a server on the network seem to be overcome or reduced. However, in contrast to these expensive and cumbersome hardware solutions, a simpler and better way to achieve the same results is through a software solution.

The root cause of the problems mentioned previously is the fact that there is only a single copy of shared files stored on the disk of the network server. The advantage of keeping one single copy of the shared files on the network is that it is easy to maintain and update the files. However, since there is only one copy of the shared files on the network, the following disadvantages result:
  1. All clients systems on the network have to send their requests through multiple routers and/or switches before they reach the network server. Consequently, the network server is overloaded and the network becomes congested.
  2. No network can afford to let this single copy of shared information become unavailable, so a disk array with a RAID level is needed to protect the sole copy of files on the disk from becoming unavailable.
  3. In addition to using the disk array to protect the shared information on the disk, a fault-tolerant system or clustering system is also needed as protection against network server failures, which can result from failures in any of several key components as well as from failure of the network server itself.

SUMMARY OF THE INVENTION

These disadvantages can be mitigated or eliminated by using multiple network servers on the network, preferably one per sub-network. Each network server contains a copy of the shared files on its disk and shares them across the network. This arrangement works successfully as long as every copy of the files is identical and all copies are updated in real time whenever an update occurs on any copy.

In accordance with the present invention, this objective is achieved by means of a mirror file system (MFS). A MFS is a virtual file system that links two or more file systems together and mirrors between them in real time. When the MFS receives updated data from an application, all file systems linked by the MFS are updated in real time. The file systems linked and mirrored through the mirror file system can be a local file system connected to a physical device, or a network file system exported by a remote system on a network. The real-time mirroring mechanism provided by the MFS is transparent to user applications. The system administrator first sets up the mirroring mechanism by linking a file system to another file system on a single directory through an MFS mounting protocol. These two file systems and their files are linked together and become a mirroring pair. Both copies are owned by, and under the management of, the MFS. All access to files or directories in both file systems go through the MFS. The user applications perform normal file system operation and file/directory operation system calls like open, read, write and close functions from the pathname of either file system. Most of the file operations (such as a read operation) only need to go to one file system under the MFS to get the data. Only when updates occur, such as a write operation, the MFS mechanism ensures that all data updates go to both the file systems. With this mirroring mechanism of the MFS, the files/directories in one file system are mirrored to their mirroring counterparts of another file system in real time. With the MFS technology, a standalone system is able to make multiple copies of data available to the application. In the network environment, multiple servers owning the same data copy can be distributed on the network and mirror the data to each other in real time to provide more efficient and more reliable service to their clients.

Hence, the mirror file system links any two regular file systems together and provides data management to make sure that the two file systems contain identical data and are synchronized with each other in real time. There are several benefits associated with the use of the mirror file system. A network server with the mirror file system on a sub-network can mirror its file system to another file system located on another network server, or on a different sub-network, in real time. Thus, the mirror file system allows critical information to be reflected simultaneously on multiple servers at different sub-networks, which synchronize with one another instantaneously so that neither time nor information is lost during updates. With real-time mirroring of critical information over the larger network, a client system can access the information on any network server. Although it is preferable to use the closest network server on its sub-network, a client system can switch seamlessly to an alternate network server on another sub-network whenever necessary and continue to access the critical information without interruption.

The mirror file system achieves the following major objectives of network operation:

1. It provides a complete solution to the RAS (Reliability, Availability, Serviceability) problem on all levels (storage, system, and network). Whenever a disk storage system, a system connected to it, or any network (or sub-network) component becomes unavailable due to power outage, system crash, hardware failure, or scheduled maintenance, the critical information remains available on another network server. All clients that cannot be served by their primary network server can switch to their secondary network server for virtually continuous access to the same critical information. The secondary network server can be deployed on a different sub-network of a large enterprise network, and can be located as far away as desired.

2. It provides fast service for mission-critical applications. With more than one network server deployed on different sub-networks, a client can access the closest network server to get critical information faster; without the need to traverse many switches or routers on the enterprise network, which is the case when there is only one network server.

3. It reduces network traffic congestion by serving identical information on multiple network servers. When a client can get the critical information from the closest network server on its sub-network, there is no need to travel outside the sub-network. This reduces total traffic on the large enterprise network as well as the cost of purchasing and maintaining multiple fast switches and routers.

4. It eliminates the problem of overloading a single network server. When a single network server is overloaded by an increasing number of requests from the clients, IT professionals can simply add more network servers on the enterprise's network instead of getting more CPUs for the single network server. Several small to mid-size network servers work better than a single centralized network server in terms of dealing with the RAS problem, providing fast service, and reducing network traffic.

5. It distributes and balances workload and traffic among multiple network servers. With multiple network servers containing the same critical information, IT professionals can distribute and balance the workload and traffic on the enterprise' s sub-network to make overall network operation considerably faster and smoother.

DETAILED DESCRIPTION

A. Overview

Figure 1:
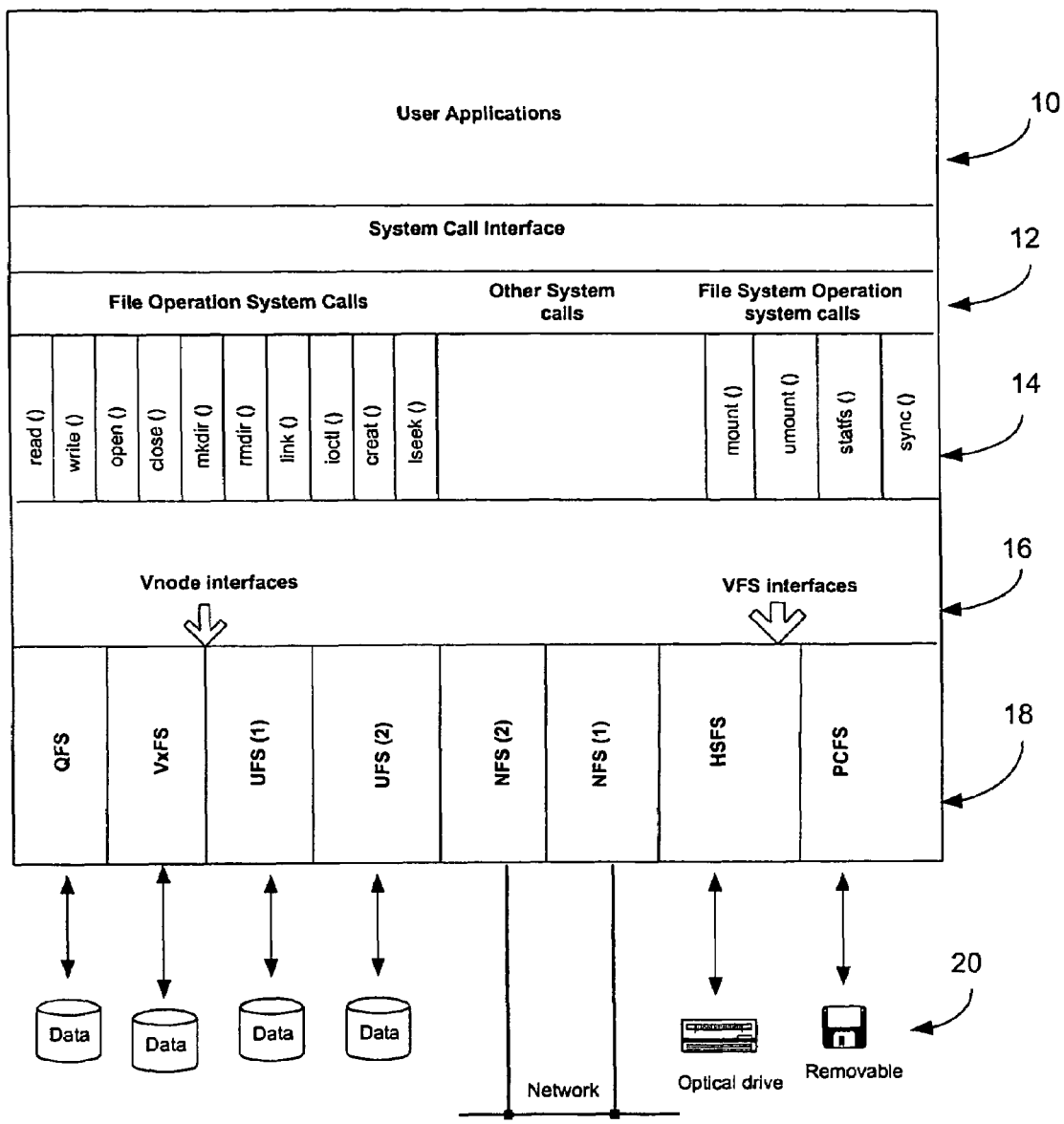
FIG. 1 is a block diagram of a conventional file system framework.

To facilitate an understanding of the invention, an overview will first be provided of a typical example of a file system. Most operating systems, such as Unix, provide multiple and different file system types within their operating environments. Some file systems, e.g. the Unix File System (UFS) or High Sierra File (HSFS) for CD-ROMs, have the physical storage to hold the actual file data; other file systems, e.g. Special Device File System (Specfs) or Network File System (NFS), do not have the physical storage. All these file systems observe interface conventions defined by the operating system, so that they can be loaded and plugged into the operating system easily. An application program can access the file data or device in these file systems by using the standard system calls provided by the operating system without the need to know the idiosyncrasies of each file system.

The interfaces can be used:

1. Between the system calls and the underlying file systems: An application program makes system calls to access the file system or individual file/directory. The system calls convert those access requests into one or more file system or file/directory operation requests for the intended file system through the interface. The file system then presents those requests to its physical storage and returns the result back to the application program.
2. Between the file systems: A file system gets the file system and file/directory operation requests from the system call through the interface. It can present those requests to its physical storage, or send the request to another file system through the interface again and let another file system handle the activities of physical storage.

The interfaces defined by the operating system fall into two categories; one is the interface for the file system itself; the other is the interfaces for individual files or directories within the file system. For ease of understanding, the terminology for interfaces as defined by the UNIX Operating System will be employed hereinafter. The interface for the file system is called the Virtual File System interface (VFS), and the interface for the individual file or directory is called the Virtual Node (VNODE) interface.

1. The Virtual File System (VFS) Interface

The VFS interface has seven or eight interfaces/operations for a File System:

| | | |
|---|---|---|
| 1) | vfs_mount( ) | mounts a file system |
| 2) | vfs_unmount( ) | unmount a file system |
| 3) | vfs_root( ) | find the root for a file system |
| 4) | vfs_statvfs( ) | gets the statistics of a file system |
| 5) | vfs_sync( ) | sync the file system |
| 6) | vfs_vget( ) | find the vnode that matches a file ID |
| 7) | vfs_mountroot( ) | mount the file system on the root directory |

All VFS interfaces are intended for the operations on a file system, such as mounting, unmounting, or synchronizing a file system. The VFS interface consists of two parts. One is the vfs structure, the other is the MACRO definitions for the vfs operation of the file system.

The vfs structure is as follows:

```
/*
 * Structure per mounted file system. Each mounted file system has
 * an array of operations and an instance record.
 *
 * The file systems are kept on a singly linked list headed by "rootvfs"
 * and terminated by NULL. File system implementations should not
 * access this list; it's intended for use only in the kernel's vfs layer.
 */
typedefstruct vfs {
    struct vfs      *vfs_next;          /* next VFS in VFS list */
    struct vfsops   *vfs_op;            /* operations on VFS */
    struct vnode    *vfs_vnodecovered;  /* vnode mounted on */
    uint_t          vfs_flag;           /* flags */
    uint_t          vfs_bsize;          /* native block size */
    int             vfs_fstype;         /* file system type index */
    fsid_t          vfs_fsid;           /* file system id */
    caddr_t         vfs_data,           /* private data */
    dev_t           vfs_dev,            /* device of mounted VFS */
    ulong_t         vfs_bcount;         /* I/O count (accounting) */
    ushort_t        vfs_nsubmounts;     /* immediate sub-mount count */
    struct vfs      vfs_list;           /* sync list pointer */
    struct vfs      *vfs_hash;          /* hash list pointer */
    ksema_t         vfs_reflock;        /* mount/unmount/sync lock */
};
```

Within the vfs structure, there is a vfsops struct containing file system operations like mount, unmount, sync, etc. that can be performed on the file system.

The vfsops structure looks like the following:

```
/*
 * Operations supported on virtual file system.
 */
typedefstruct vfsops {
    int     (*vfs_mount) (struct vfs *, struct vnode *, struct mounta *,
                struct cred *);
    int     (*vfs_unmount) (struct vfs *, int, struct cred *);
    int     (*vfs_root) (struct vfs *, struct vnode **);
    int     (*vfs_statvfs) (struct vfs *, struct statvfs64 *);
    int     (*vfs_sync) (struct ifs *, short, struct cred *);
    int     (*vfs_vget) (struct vfs *, struct vnode **, struct fid *);
    int     (*vfs_mountroot,) (struct vfs *, enum whymountroot,);
    int     (*vfs_swapvp) (struct vfs *, struct vnode **, char *);
    void    (*vfs_freevfs) (struct vfs *),
} vfsops_t,
```

All of the functions in the vfsops structure are invoked through VFS MACROs, which are defined as follows:

```
#define VFS_MOUNT(vfsp, mvp, uap, cr) \
    (*(vfsp) -> vfs_op-> vfs_mount)(vfsp, mvp, uap, cr)
#define VFS_UNMOUNT(vfsp, flag, cr) \
    (*(vfsp-> vfs_op-> vfs_unmount)(vfsp, flag, cr)
#define VFS_ROOT(vfsp, vpp) \
    (*(vfsp)-> vfs_op-> vfs_root)(vfsp, vpp)
#define VFS_STATVFS(vfsp, sp) \
    (*(vfsp-> vfs_op-> vfs_statvfs)(vfsp, sp)
#define VFS_SYNC(vfsp, flag, cr) \
    (*(vfsp-> vfs_op-> vfs_sync)(vfsp, flag, cr)
#define VFS_VGET(vfsp, vpp, fidp) \
    (*(vfsp)-> vfs_op->vfs_vget)(vfsp, vpp, fidp)
#define VFS_MOUNTROOT(vfsp, init) \
    (*(vfsp)-> vfs_op-> vfs_mountroot)(vfsp, init)
#define VFS_SWAPVP(vfsp, vpp, nm) \
    (*(vfsp-> vfs_op-> vfs_swapvp)(vfsp, vpp, nm)
#define VFS_FREEVFS(vfsp)        \
    (*(vfsp)-> vfs_op-> vfs_freevfs)(vfsp)
```

In the Unix operating system, every file system is allocated a vfs structure. When the operating system kernel receives a system call from an application program that intends to perform a file system operation on a file system, it uses the above MACROS with the vfs structure pointed to by the vfsp input parameter to invoke the file system operation on the file system. The MACROS are defined in a file-system-independent manner. With the input vfsp parameter, the kernel invokes the desired file system operation of a file system.

2. The Virtual Node Interface

The Vnode interface has about 30 to 40 interfaces/operations for a file/directory:

| | | |
|---|---|---|
| 1. | vop_access( ) | Checks access to a file |
| 2. | vop_close( ) | closes a file |
| 3. | vop_create( ) | creates a file |
| 4. | vop_getattr( ) | gets the attributes for a file |
| 5. | vop_link( ) | creates a link for a file |
| 6. | vop_lookup( ) | looks up a path name for a file |
| 7. | vop_mkdir( ) | makes a directory |
| 8. | vop_open( ) | opens a file |
| 9. | vop_read( ) | reads the data from a file |
| ... | | |
| 32. | vop_setattr( ) | sets the attribute for a file |
| 35. | vop_write( ) | writes the data to a file |

All Vnode interfaces are intended for operation on an individual file or directory within a file system. Like the file system operations in the VFS interface, the Vnode Interface also consists of two parts, one part is the vnode structure, the other is the MACRO definitions for the vnode operations of the file/directory.

The following is the vnode structure:

```
typedef struct vnode {
    kmutex_t         v_lock;              /* protects vnode fields */
    ushort_t         v_flag;              /* vnode flags (see below) */
        unint_t      v_count;             /* reference count */
        struct vfs   *v_vfsmountedhere;   /* ptr to vfs mounted here */
        struct vnodeops *v_op;            /* vnode operations *1
        struct vfs   *v_vfsp;             /* ptr to containing VFS */
        struct stdata *v_stream;          /* associated stream */
        struct page  *v_pages;            /* vnode pages list */
        enum vtype   v_type;                  /* vnode type */
        dev_t        v_rdev;              /* device (VCHR, VBLK) *1
        caddr_t      v_data;              /* private data for fs *1
        struct filock *v_filocks;         /* ptr to filock list */
        struct shrlocklist *v_shrlocks;   /* ptr to shrlock list */
        kcondvar_t   v_cv;                /* synchronize locking */
        void         *v_locality,.        /* hook for locality info */
} vnode_t;
```

Within the vnode structure, there is a vnodeops struct containing the file/directory operations such as vop_access( ), vop_open( ), vop_creat( ) and vop_write( ), etc. that can be performed on the associated vnode of a file/directory.

The vnodeops structure looks like the following:

```
typedef struct vnodeops {
    int  (*vop_open) (struct vnode **vpp, int flag, struct cred *cr);
    int  (*vop_close) (struct vnode *vp, int flag, int count,
                       offset_t offset, struct cred *cr);
    int  (*vop_read) (struct vnode *vp, struct uio *uiop, int ioflag,
                      struct cred *cr);
```

-continued

```
    int  (*vop_write) (struct vnode *vp, struct uio *uiop, int ioflag,
                       struct cred *cr);
    int  (*vop_ioctl) (struct vnode *vp, int cmd, intptr_t arg, int flag,
                       struct cred *cr, int *rvalp);
    int  (*vop_setfl) (struct vnode *vp, int oflags, int nflags,
                       struct cred *cr);
    int  (*vop_getattr) (struct vnode *vp, struct vattr *vap, int flags,
                         struct cred *cr);
    int  (*vop_setattr) (struct vnode *vp, struct vattr *vap, int flags,
    int  (*vop_access) (struct vnode *vp, int mode, int flags,
                        struct cred *cr);
    int  (*vop_lookup) (struct vnode *dvp, char *nm, struct vnode
                        **vpp, struct pathname *pnp, int flags, struct vnode
                        *rdir, struct cred *);
    int  (*vop_create) (struct vnode *dvp, char *name, struct vattr
                        *vap, vcexcl_t excl, int mode, struct vnode **vpp,
                        struct cred *cr, int flag);
    ........................
    ....................
    int  (*vop_mkdir) (struct vnode *dvp, char *dirname,
                       struct vattr *vap, struct vnode **vpp, struct
                       cred *cr);
} vnodeops_t,
```

The functions in the vnodeops structure are invoked through the vnode operations MACROs. The MACROS definitions of vnode operations are the following:

```
#define VOP_ACCESS(vp, mode, f, cr) \
    (*(vp)-> v_op-> vop_access)(vp, mode, f, cr)
#define VOP_CLOSE(vp, f, c, o, cr) \
    (*(vp)-> v_op-> vop_close)(vp, f, c, o, cr)
```

-continued

```
#define VOP_CREATE(dvp, p, vap, ex, mode, vpp, cr, flag) \
    (*(dvp)-> v_op-> vop_create)(dvp, p. vap, ex, \
    mode, vpp, cr, flag)
#define VOP_GETATTR(vp, vap, f, cr) \
    (*(vp)-> v_op-> vop_getattr)(vp, vap, f, cr)
#define VOP_LINK(tdvp, fvp, p, cr) \
    (*(tdvp)-> v_op-> vop_link)(tdvp, fvp, p, cr)
#define VOP_LOOKUP (vp, cp, vpp, pnp, f, rdir, cr) \
    (*(vp)-> v_op-> vop_lookup)(vp, cp, vpp, pnp,
                                f, rdir, cr)
#define VOP_MKDIR(dp, p. vap, vpp, cr) \
    (*(dp)-> v_op-> vop_mkdir)(dp, p, vap, vpp, cr)
#define VOP_OPEN(vpp, mode, cr) \
    (*(*(vpp))-> v_op-> vop_open)(vpp, mode, cr)
```

-continued

```
#define VOP_READ(vp, uiop, iof, cr) \
    (*(vp)-> v_op-> vop_read)(vp, uiop, iof, cr)
    ......................
    ......................
#define VOP_WRITE(vp, uiop, iof, cr) \
    (*(vp)-> v_op-> vop_write)(vp, uiop, iof, cr)
#define VOP_SETATTR(vp, vap, f, cr) \
    (*(vp-> v_op-> vop_setattr)(vp, vap, f, cr)
```

Every file or directory in the file system is allocated a vnode structure that holds all information about that file or directory.

When the operating system kernel receives a file or directory operation system call from an application program that intends to perform an operation on a file or directory, it uses the foregoing macros with the information in the vnode structure pointed to by the vp input parameter to invoke the desired vnode operation on the file or directory.

FIG. 1 shows the layout of several file systems and the VFS, Vnode interfaces in the operating system.

The operation and data flow proceed as follows:
a. A user application 10 makes a file system operation or file operation system call into the operating system 12.
b. The system call generates one or more VFS and Vnode operation calls 14.
c. The VFS and Vnode operation calls then go through the VFS and Vnode interface layer 16 to switch to the intended file system 18.
d. The intended file system sends the VFS and Vnode operation to its physical storage 20 and gets the result.
e. The intended file system returns the result back to the application program 10.

3. The mirror file system interface

The mirror file system of the present invention, like other file systems, also follows the VFS and Vnode interfaces, so it can be loaded and plugged into the operating system. The application 10 uses the same system calls to access the file system and individual file/directory within the mirror file system. The mirror file system does not have physical storage; instead it has two or more file systems under it. Each of the file systems under the mirror file system has a local physical storage 18a, e.g. UFS, or a remote physical storage 18b on another system, e.g. NFS. The UFS or NFS under the mirror file system has the same VFS and Vnode interfaces as it normally would. The mirror file system use these standard interfaces to perform the operations on the UFS/NFS file systems and their individual files or directories.

Figure 2:
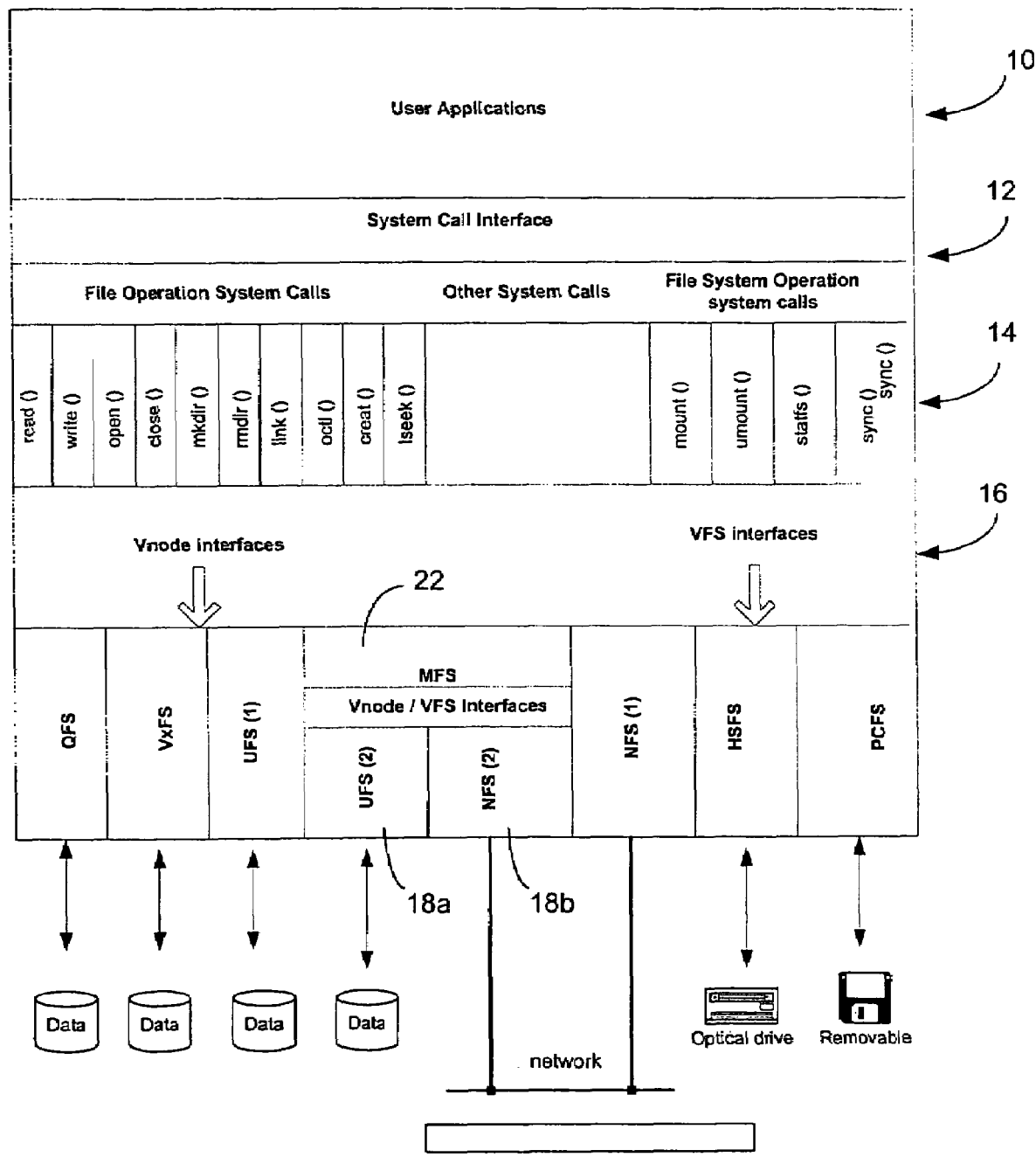
FIG. 2 is a block diagram of a file system incorporating the present invention.

FIG. 2 shows several file systems and the mirror file system in an operating system. The mirror file system 22 is loaded on top of a Unix File System (UFS) and a Network File System (NFS). Other UFS and NFS file systems can co-exist in parallel with MFS as shown in the figure. When the MFS is loaded into the system, it links the two file systems, UFS and NFS, together through its mount protocol. After the mount operation, the UFS and NFS are under the management of MFS. All system calls for file system operations and individual file/directory operations from the application are directed to the MFS first via the same VFS and Vnode interfaces. When it receives the VFS or Vnode operation from the system calls originated by the application, the MFS first performs some housekeeping tasks on the operations, and then sends the operations to UFS and NFS via the VFS and Vnode interface again. By keeping the same VFS and Vnode interface between the system call and MFS, and between the MFS and the underlying UFS and NFS, the MFS achieves the following goals:

1) The application does not need to re-compile or to re-link. The path name for a file or directory accessed by the application remains intact. No new directory or symbolic links are created or needed for the application to function properly with the MFS mounted. Consequently, the application need not be aware of the existence of the MFS in the system. The application can access the mirror file system and its file/directory in the same manner as it did before the MFS was loaded into the system.

2) The UFS and NFS do not need any changes. They can a) co-exist in parallel with the MFS as a standalone file system like UFS(1) and NFS(1), or b) be linked and managed by the MFS as a sub-file system like UFS(2) and NFS(2) in FIG. 2. In the first case, the UFS or NFS receives the VFS and Vnode operations from the system call originated by the application and sends the operations to its physical storage; in the second case the UFS and NFS receive VFS and Vnode operations from the MFS, and then send the operations to their physical storage.

3) It is a building block approach. The MFS is built on top of existing UFS and NFS. Another file system can also be built on top of the MFS and other file system jointly or independently, and be plugged into the operating system.

B. Exemplary Embodiment

A more detailed description of the mirror file system of the present invention is presented hereinafter.

1. The MFS Mount Protocol

In the Unix operating system, every file system mounted by the system has a virtual file system data structure named vfs that contains information about the file system and its operations as described before. Normally only one file system can be mounted on a directory. When a new file system is mounted on a directory, the directory's previous contents are hidden and cannot be accessed until the new file system is unmounted from the directory. Hence, the application can only see the contents of the new file system when accessing the directory. In contrast, when the MFS links file systems together and forms a mirroring pair, the MFS mount protocol mounts two file systems on a single directory. This protocol provides a new approach for mounting a file system on a directory.

a. The MFS mount protocol allows either an entire file system of part of a file system (represented by a directory) to be mounted on a directory.
b. When the MFS mounts a directory with a file system or a part of a file system, the previous contents of the mounted directory are not hidden.
c. The MFS inherits all of the contents of the mounted directory into its mfs_vfs virtual file system data structure. The inherited content is a copy of a mirroring pair. The new file system mounted on the directory is the other copy of the mirroring pair, all its contents are also inherited by MFS and put into the MFS file system data sture mfs_vfs.
d. The application still sees the previous contents of the mounted directory through its previous path name. The application also sees the contents of the newly mounted file system through its previous path name.

The mfs_vfs file system is a virtual file system that holds the information for itself and two other file systems, one of which is inherited from the mounted directory, and the other of which is the new file system that was mounted. Hence, the mfs_vfs structure contains three vfs data structures, one is the MFS itself, the other two vfs structures are for the two file systems linked by the MFS. The super mfs_vfs data structure looks like the following:

```
Struct mfs_vfs {
    Struct vfs    *mfs;          /* mirror file system vfs */
    Struct vfs    *X_vfs;        /* first file systems vfs */
    int           X_vfs_state;   /* state of X_vfs file system */
    Struct vfs    *Y_vfs;        /* second file system vfs */
    int           Y_vfs_state;   /* state of Y_vfs file system */
    Other fields
    ..............
};
```

After a file system represented by a directory is mounted on another directory by the MFS mount protocol, these two file systems are linked together and become a mirroring pair under the management of MFS operation. FIG. 2 shows that the UFS(2) and NFS(2) are linked together by the MFS mount protocol and become a mirroring pair. The MFS can mirror the entire file systems or a portion of the file systems between a mirroring pair.

Figure 3:
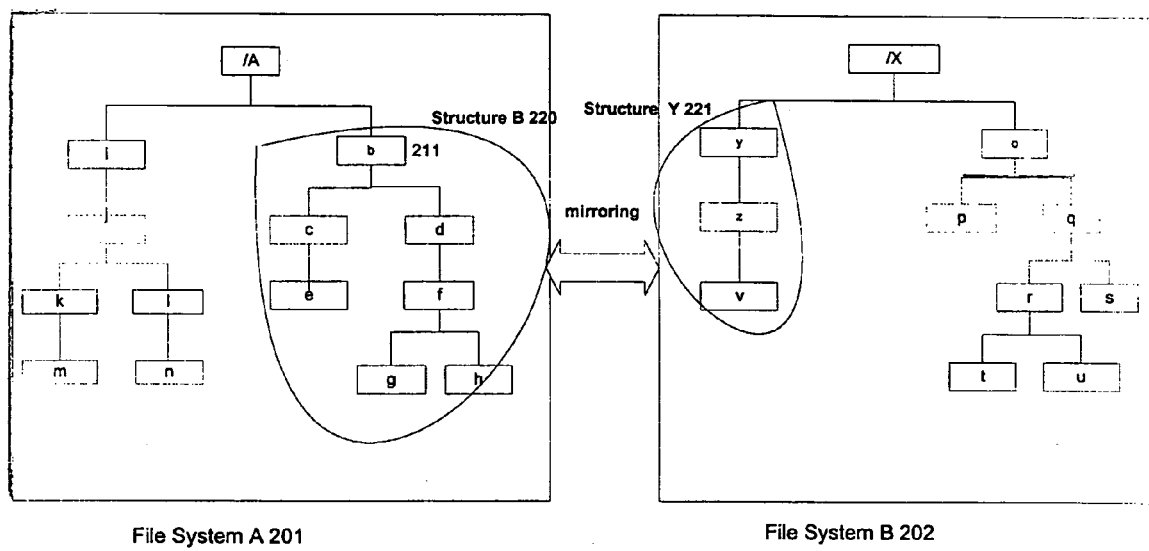
FIG. 3 is a schematic illustration of mirroring between two file structures.
Figure 4:
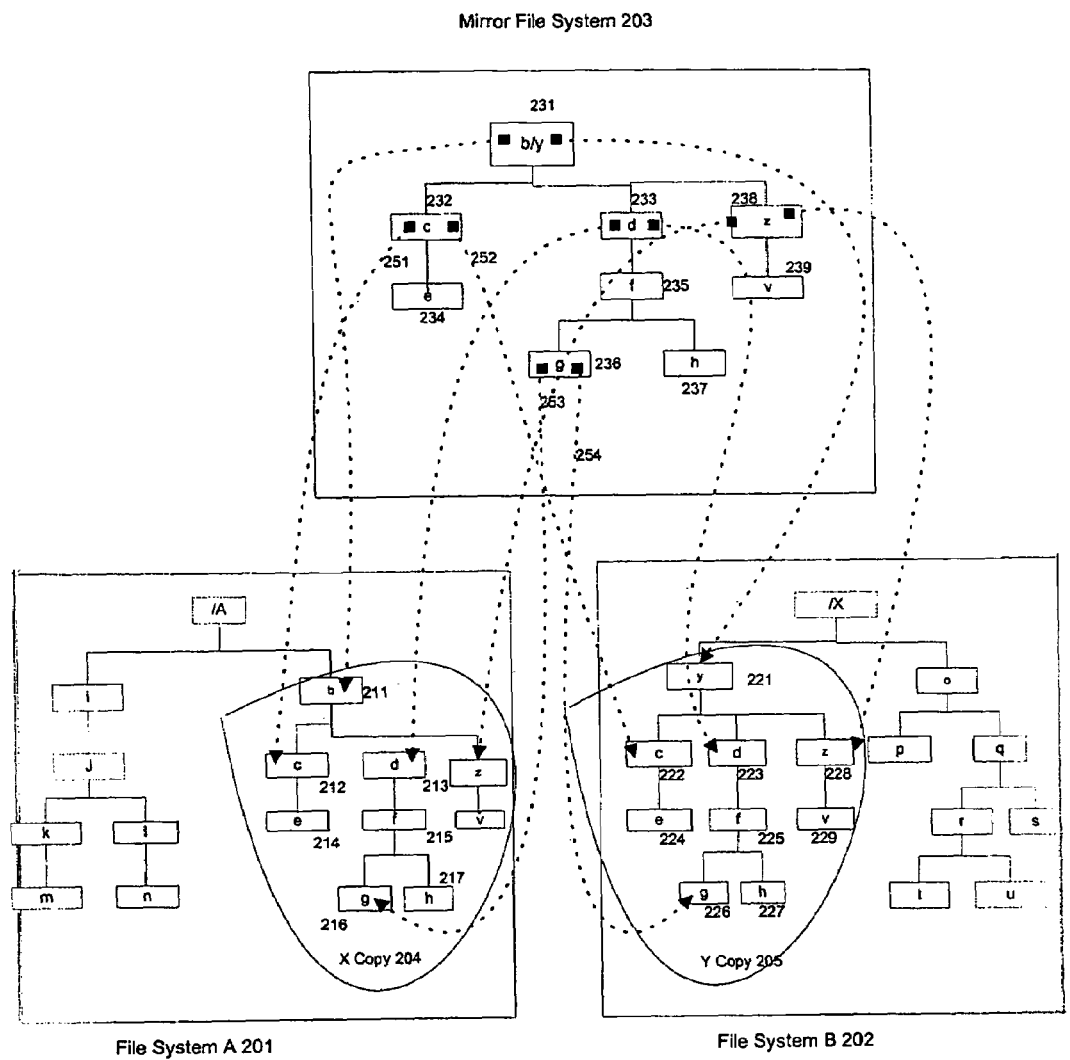
FIG. 4 is a schematic illustration of the manner in which the present invention links and mirrors between two file structures.

FIGS. 3 and 4 illustrate how the File System A 201 and the File System B 202 link and mirror each other. In FIG. 3, the structure B 220 under directory b 211 of the File System A 201 is to be linked to structure Y 221 of the File System B 202 and mirror each other. The file system mount operation of MFS is the key for linking up these two file structures 220 and 221, so the two file structures become a mirroring pair. The file system mount operation is described in detail below.

To link up these two file structures and make them a mirroring pair, the MFS can do the one of the following two things:
   a. Mount the directory y 221 of the File System B 202 onto the directory b 211 of the File System A 201.
   b. Mount the directory b 211 of the File System A 201 onto the directory y 221 of the File System B 202.

It is not significant which directory of which file system is to be the mount point for other file system. Since the file systems are a mirroring pair, they all have same privileges by default.

The MFS mount operation sets up the data structure mfs_vfs to contain the vfs data structures for these two file system structures. After the mount operation, the following structures and relationships are created as depicted in FIG. 4:
   1) A new virtual file system mirror file system 203 is created. The new mirror file system 203 is a layered virtual file system on top of File System A 201 and File System B 202. It has a data structure containing the file system and file operation information of File System 201 and File System 202.
   2) The newly created mirror file system 203 has all the elements of both the Structure B 220 (FIG. 3) of the File System A 201 and Structure Y 221 of the File System B 202. It has directories b/y 231, c 232, d 233, z 238 and f 235, files e 234, g 236, h 237 and y 239. Each element is either a file or a directory.
   3) The directory b/y 231 of the mirror file system 203 becomes the root directory of mirror file system 203.
   4) All elements of structure B 220 (FIG. 3) of File System A 201 are mirrored to directory y of File System B 202. All elements of structure Y 221 of File System B 202 are also mirrored to directory b of File System A 201. In other words, all of the elements of structure B and structure Y are copied to a physical storage device of File System A and B, so the structures in the two file systems are synchronized with each other after the MFS mount operation.
   5) If there is a file or directory that exists on both file systems, then the timestamp of the file or directory is used to decide which copy is to be preserved.
   6) An application can access the root directory b/y of MFS by using the path name from either file system, /A/b or /X/y, and get to the root node of the newly created MFS. All file system operations, as well as individual file or directory operations, are handled by the MFS for all the files and directories under the root directory b/y of the newly created MFS.

2. The MFS Unmount Protocol

To break the mirroring setup, the mirror file system unmounts directory y of File System B 202 from the directory b of the File System A 201. Then all relationships are reverted back to their original state. The two file systems that were linked and mirrored to each other by the MFS are independent of one another again.

FIG. 1 shows the original file systems layout after MFS umounting ufs(2) and nfs(2) from FIG. 2.

3. File/Directory Operations

After two file systems are linked and mounted on a directory by the MFS mount protocol, the individual files and directories within the two file systems are ready to accept operations from the MFS and the application.

Every element of a file system, file or directory, has a vnode data structure containing information and the operations can be performed on this file or directory.

In Unix and other operating systems, normally only one vnode data structure is allocated per file or directory. Since the MFS has two file systems under its management, each file or directory in the MFS has two files or directories under its management, one for each of the two file systems. Every file or directory of MFS will have a super vnode structure called mnode. This mnode contains a vnode structure and two vnode pointers. The vnode named m_vnode is the vnode for the file or directory within MFS, the two vnode pointers, *m_Xvp and *m_Yvp, point to the real vnode of the file or directory within the two file systems. The mnode data structure of MFS File System looks like the following:

```
/*
 * The mnode is the "vnode" mirror files. It contains
 * all the information necessary to handle two real vnodes it links
 */
typedefstruct mnode {
    struct vnode   m_vnode;   /* vnode for mirror file system */
    struct mnode   *m_next;   /* link for hash chain */
    struct vnode   *m_Xvp;    /* pointer to X vnode */
    struct vnode   *m_Yvp;    /* pointer to Y vnode */
    int            state;     /* state of the mnode */
} mnode_t;
```

FIG. 4 shows a detailed picture of what the MFS looks like and its relationship with two underlying file systems. The directory b/y 231 is a newly created directory, the root of new mirror file system 203. The directory b/y 231 of mirror file system 203 is a virtual directory, there is no physical storage for any file or directory within the mirror file system. But the directory b/y 231 of mirror file system 203 has a mnode data structure allocated by the MFS. Within its mnode, it has two pointers; one pointer named m_Xvp points to the b directory of File System A 201; the other pointer named m_Yvp points to y directory of File System B 202. These two directories pointed to by two pointers of mnode reside in the physical storage devices.

When an application program 10 accesses either 1) the b directory of File System A 201 by using the path name of /A/b from the File System A, or 2) the y directory of File System B 202 by using the path name /X/y from the File System B 202 as it did before the MFS is mounted, the system detects that the directory b or directory y has the mirror file system 203 mounted on it (by checking the v_vfsmountedhere field of the vnode), and it becomes the root directory b/y 231 of mirror file system 203. All file access requests (open, read, write, seek, close, etc.) are directed to the vnode operation (struct vnodeops *v_op) of vnode for the virtual directory b 231 of mirror file system 203. When the vnode operation (for example, the vop_open( ) operation for an open request from the application) of directory b 231 gets the open request, it will first get the mnode from private data field v_data of its vnode. From the mnode, the vop_open( ) operation finds both the vnodes of directory b of File System A 201 and the vnode of directory y of File System B 202. The open request is then sent to vop_open( ) operations of both vnodes. The codes for vop_open( ) in mirror file system look like the following:

```
static int
mfs_open(register vnode_t **vpp,
    int flag,
    struct cred *cr)
{
    struct mnode   *mp;          /* mnode for MFS */
    vnode_t        vp = vpp;     /* vnode for MFS */
    vnode_t        *X_vp;        /* vnode of X copy */
    vnode_t        *Y_vp;        /* vnode of Y copy */
    int            X_error = -1, Y_error = -1;
    /*
     *   process open for X vnode
     */
    mp = vp-> v_data;            /* get the mnode */
    X_vp = mp-> X_vp;            /* get X vnode */
    /*
     *   send the request to vop_open( ) of X vnode
     */
    X_error = VOP_OPEN(&X_vp, flag, cr);
    /*
     * process open for Y vnode
     */
    Y_vp = mp-> Y_vp; /* get Y vnode */
    /*
     *   send the request to vop_open( ) of Y vnode
     */
    Y_error = VOP_OPEN(&Y_vp, flag, cr);
}
    return (X_error | Y_error),
}
```

All other vnode operations like mfs_read( ), mfs_write( ), mfs_setattr( ), mfs_close( ), etc., follow the same procedure as described in mfs_open( ) to perform the same identical operations with the same parameters on both copies of the mirroring pair. This is how the mirror file system achieves the real-time mirroring effect between the mirroring pair.

4. One Read and Two Write Operations

Since both X and Y copies contain identical information, not every operation needs to be performed on both X and Y copies. For example, the read operation can get all information from either the X or Y copy.

The mirror file system basically applies the following rules in deciding which operation goes to which copy:

a. For Open and Create operations, the mirror file system will invoke the operations that go to both X and Y copies.

b. For a Read operation, the mirror file system only needs to invoke the operation that goes to one copy to obtain the requested data. Which copy a file operation goes to is configurable during the MFS mount operation.

c. For Write file operations, the mirror file system will invoke the operations that go to both X and Y copies.

5. Configuration of Master and Slave

The preceding section describes how the MFS mount protocol sets up a mirroring pair and how the file operations operate on the mirroring pair. The privileges of the pairs are equal, that is, either one can mirror its contents to its counterpart in real time. The user can also configure the pairs into a Master and Slave relationship. One file system is the Master; the other one is the Slave. The Master can mirror its contents to its Slave, but not the other way. The Master-Slave configuration may be desirable when one of the mirroring pair is a Network File System that has the physical storage on the remote host.

6. Data Coherency and Consistency

As discussed previously, the write operation will go to both copies. To make sure that the two copies will be identical at all times, the write operation on both copies should be atomic; in other words, during the data writing to both copies, no other operations (read and/or write) should be allowed on the two copies. To achieve this, a locking mechanism is needed. The MFSs' vop_write( ) operation acquires the locks by calling the vop_rwlock( ) operation of the first vnode, then acquires the lock for second vnode. Both locks of vnode have to be secured before the writing can proceed. If only one lock is granted, and the other one is held by another process, the MFS releases the first lock it is holding to avoid a deadlock in the case that another process that held the second lock also is trying to hold the first lock. After releasing the lock of the first vnode, the vop_write( ) operation uses a backoff algorithm to wait for a period of time before trying to acquire the locks on both vnodes again.

7. MFS Failover and Recover Operations

Most of the file operation requests from the application can be executed on the X copy 204 and get all correct data. The X copy 204 may become unavailable due to:

a. Maintenance work on the physical device of the X copy, or b. Hardware failure on the controller or disk, or the network is down and the Network File System under MFS cannot be reached.

When this occurs, the mirror file system 203 switches the file operations to the Y copy to get the correct information.

The recover or re-sync operation of MFS after the failover is the following:

1) In case a, the MFS is signaled by an application that issues IOCTL calls to tell the MFS that the X copy will be taken down. When the MFS receives the call, it flags the state of X copy in the mfs_vfs structure to be an unavailable state.

2) In case b, the MFS flags the state of X copy after retrying the operation a pre-defined number of times without success.

From that point on the state of X copy is changed and the MFS does not invoke any file operation of X copy, and keeps a log of what vnode (file or directory) has been updated on the Y copy. When the X copy comes back on line again, the application issues another call to signal MFS that the X copy is back on line again. The MFS then changes the state of X copy in the mfs_vfs structure to the available state. The MFS then syncs the X copy with the vnodes that were updated in the meantime, as stored in the log, and changes the state of the X copy in the mfs_vfs structure to be the available state.

If the down time of the X copy becomes too long, so that the log entry of vnodes overflows, then the MFS re-syncs the entire X copy with the contents of Y copy, similar to the re-sync operation of MFS mount protocol, when it receives the signal from the application.

8. Sharing the Mirror File System on the Network

Once the two file system are linked by the MFS and set up on a network server, the mirror file system can be exported and shared by all clients on the network using the NFS share command and protocol. The clients can mount the mirror file system from the network server across the network and access it as if it were a local file system. All the mirroring is carried out on the network server. The command that shares or exports the mirror file system is the same command that is used to share any other file system; there is no additional file or database required to do the sharing or exporting. For the client to import or to mount the shared mirror file system on its system, it uses the same command as that which is used for importing or mounting other shared file systems.

C. Configuration and Application

Figure 5:
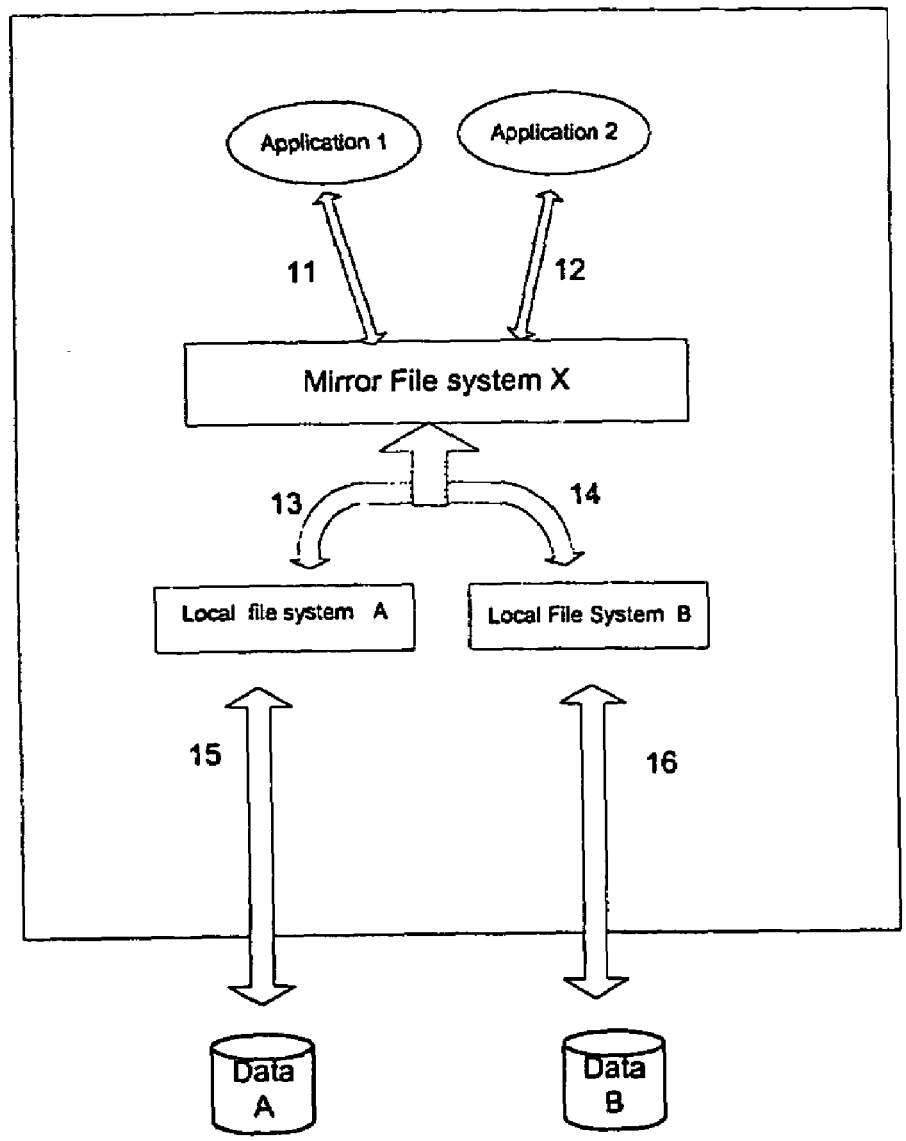
FIG. 5 is an illustration of a first embodiment of the invention, in which a standalone system mirrors between two local file systems.

The preceding sections describe how the mirror file system links and mirrors between file systems within a computer system. This section discusses how the mirror file system can be configured in the following system environments:

a. Standalone system b. A server system in a network environment c. A client system using the mirror file system 1. Mirror Between Two Local File Systems FIG. 5 illustrates how a standalone mirror system X uses mirror file system X linking and mirroring between a local file system A and a local file system B. The local file system A has its data stored on a physical device Disk A; the local file system B has its data stored on Disk B. The two local file systems are linked and become a mirroring pair by the MFS mount protocol.

When Application 1 sends a file operation request 11 to mirror file system X, the mirror file system X will:

a. Invoke the file operation 13 on local file system A. The local file system A then sends the request 15 to the physical device Data A;

b. Then the mirror file system X invokes the file operation 14 on the local file system B. The local file system B then sends the request 16 to the physical device Data B.

In the case of a read file operation, MFS only needs to invoke the operation in local file system A. The manner in which MFS links and mirrors between these two file systems is described in the preceding sections.

2. Mirror Between One Local File System and One Network File System

Figure 6:
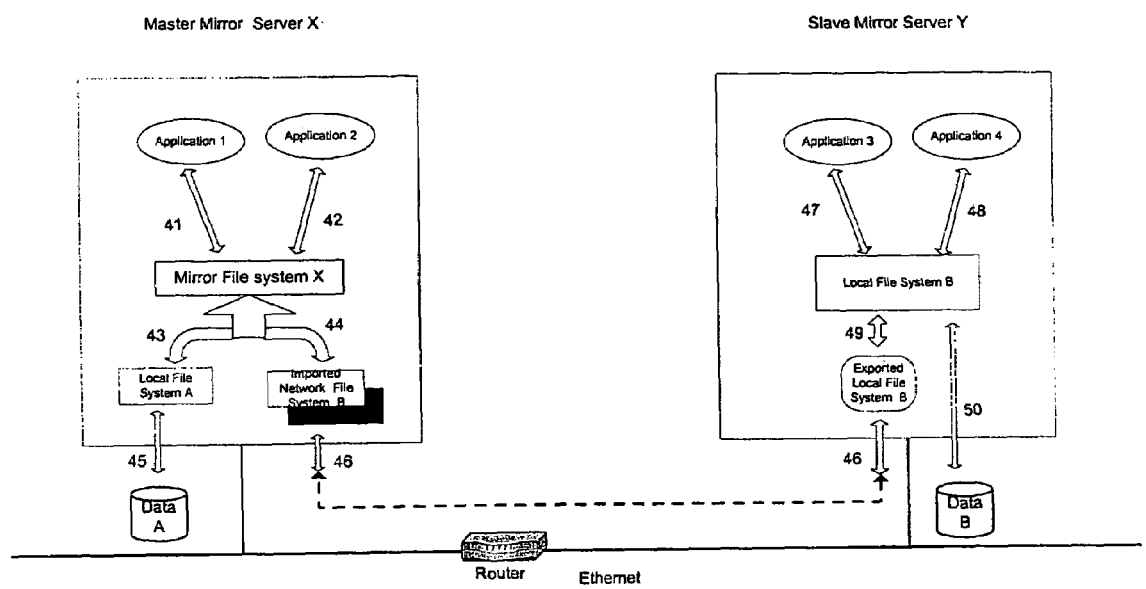
FIG. 6 is an illustration of a second embodiment of the invention, comprising a master mirror server and a slave mirror server.

FIG. 6 illustrates how a network server Master Mirror Server X uses mirror file system X to link and mirror between a local file system A and an Imported Network File system B. The local file system A has a physical device Data A on the Master Mirror Server X system, the Imported Network File system B is a Network File System (NFS) exported from a Slave Mirror Server Y on the network. Its physical storage is the Data B on the Slave Mirror Server Y. The mounting protocol, file system and file operations are the same as the two local file systems mirroring configuration described previously.

In this configuration, the Master Mirror Server X acts as a Master mirror system and the Slave Mirror Server Y acts as a Slave mirror system. The following two scenarios illustrate the Master-Slave relationship:

a. When the Master Mirror Server X updates one of the MFS pair—the local file system A or Imported Network File System B, the physical storage Data A will get updated and the Physical storage Data B of Imported Network File System B on the Slave Mirror Server Y will also get updated via the NFS protocol.

b. When the Slave Mirror Server Y updates its physical storage B through its local file system B, the updates will not go to physical storage Data A of Master Mirror Server X because the Slave Mirror Server Y does not have the MFS to carry out the mirroring. In that regard, the system is only a mirror slave system. It can receive the update from the Master Mirror Server X, but it cannot mirror its contents to the Master Mirror system.

For a mirror server to be a master mirror server on the network, it needs an imported network file system that is exported or shared by and has a physical storage on a network server. In the above example, the Master Mirror Server X can be a master mirror server due to the fact that it has an Imported Network File System B that it can link together with its local file system A through MFS.

Figure 7:
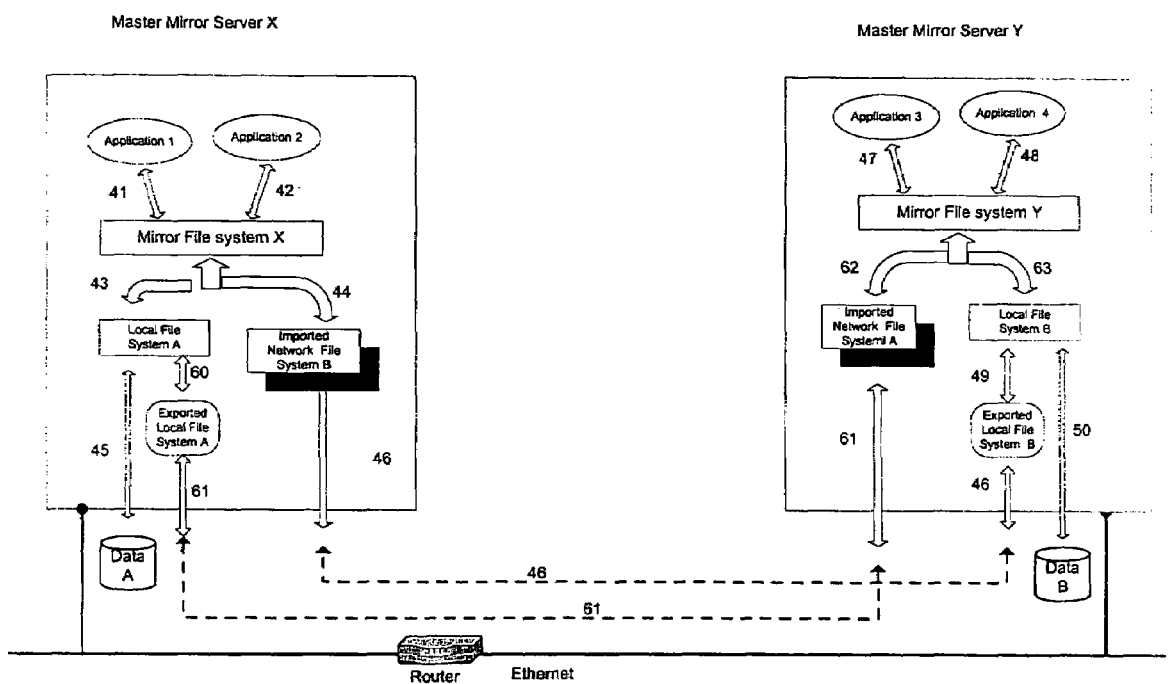
FIG. 7 is an illustration of a third embodiment of the invention, comprising two master mirror servers.

FIG. 7 shows how the Slave Mirror Server Y in FIG. 6 can be turned into a Master Mirror Server Y. To do that, as shown in FIG. 7, the Mirror Server X needs to export 60 its local file system A as the exported local file system A to the Master Mirror Server Y via network file system protocol 61 over the network, e.g. via Ethernet. The Master Mirror Server Y then links the Imported Network File System A and its local file system B together with the mirror file system Y.

When that is done, two master mirror servers reside on the network. These two master mirror servers mirror and backup each other on the network. An application can run on either master mirror server and get all needed information.

3. Mirror Between Two Imported Network File Systems

Figure 8:
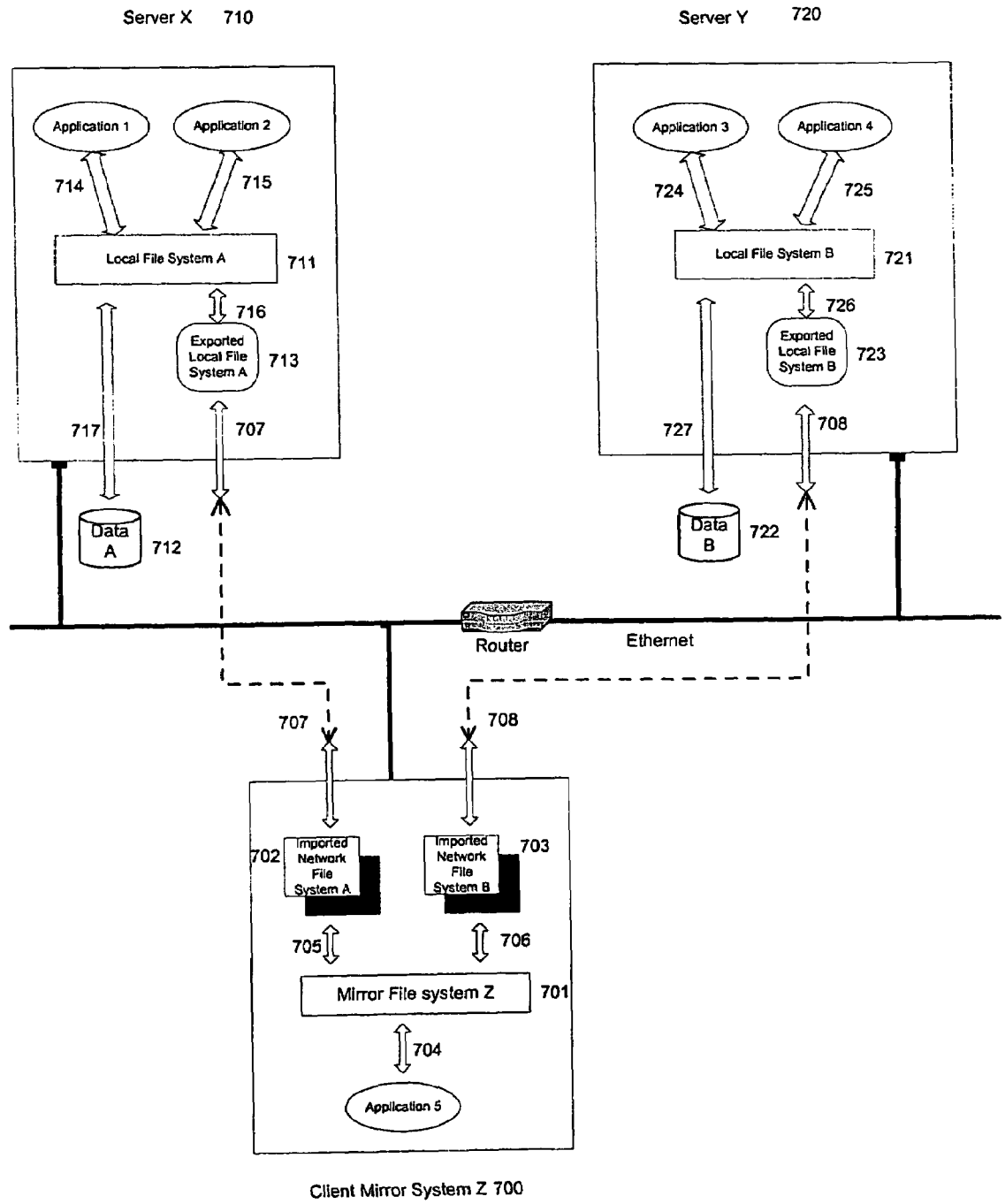
FIG. 8 is an illustration of a fourth embodiment of the invention, in which a client mirrors two imported network file systems.

FIG. 8 illustrates how the Client Mirror System Z uses mirror file system Z linking and mirroring between imported Network File system A and imported Network File System B. In this configuration, the two imported network file systems are the network file systems imported from remote systems on the network. The physical devices of the imported network file systems are on the remote computer systems on the network.

These two imported network file system are mounted on a single directory by MFS, preferably the same directory that the applications have accessed. Since there are two file systems to be mounted, the mount protocol provides a new argument to indicate that the previous contents of the mounted directory should be hidden after the MFS mount operation. The contents of the two imported file systems are inherited into mfs_vfs structure, as described previously.

In this configuration, the Client Mirror System Z is a client to access file systems on two servers, one is designated the primary server, and the other is designated a secondary server. The primary server may be deployed on the clients' sub-network; the secondary server can be deployed on a different subnet and be far away physically. When the primary server becomes unavailable, the client can switch to the secondary server. For most file system or file operations, especially the read-related operations, the client only needs to access the primary server. The client only needs to access the secondary server when doing the write-related operations.

4. Sharing Mirror File System on the Network

Figure 9:
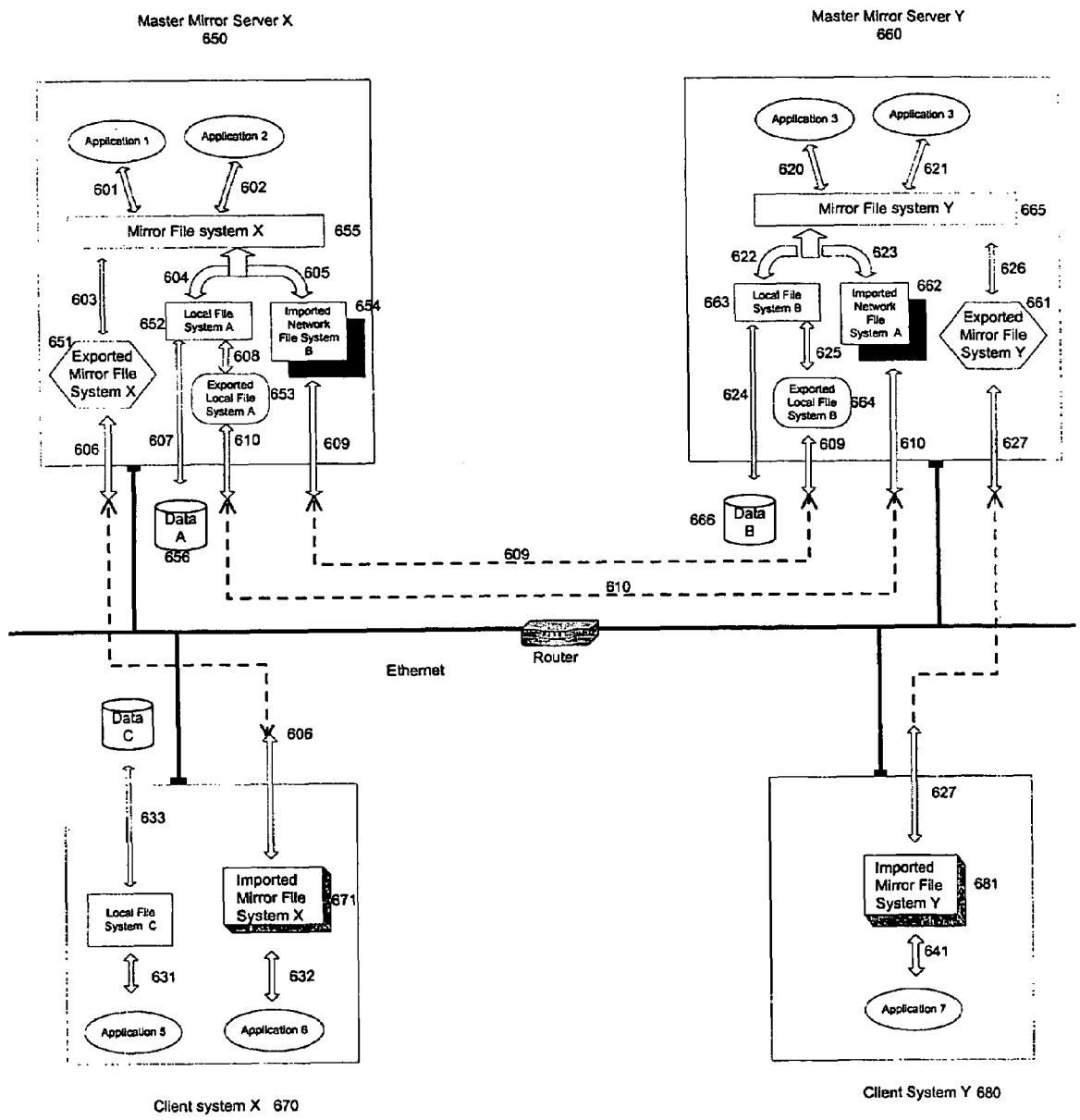
FIG. 9 is an illustration of a fifth embodiment of the invention, comprising two master mirror servers on a network.

FIG. 9 depicts how two Master Mirror Servers on the network can serve their users better by mirroring and backing up each other. One can make this configuration even better by sharing the Mirroring File Systems across the network to let the clients access them as the local file system. Every client can choose the closest Master Mirror Server on the network as its primary Mirror Server and the other one as its secondary Mirror Server. Ideally, the Master Mirror Server will be on the same subnet as all its clients to save much of the traffic from going through network routers and switches. If the primary Mirror Server becomes unavailable, the clients can switch to the secondary Mirror Server.

With reference to FIG. 9, the following is a scenario describing how the data flows between the Client and Mirror Servers:

1) Server exports the mirror file system. To share its mirror file system X 655 with client systems on the network, the Master Mirror Server X 650 needs to export 603 its mirror file system X 655 as the Exported mirror file system X 651 using the Network File System Protocol 606 to its Client System X 670 on the network, ideally on the same subnet.

2) Client imports the mirror file system. The Client System X 670 on the network imports the Exported mirror file system X 651 from the Master Mirror Server X 650 as its Imported mirror file system X 671 by using the Network File System protocol 606.

3) Applications on the client access shared mirror file system. When an Application 6 on the Client System X 670 makes an update 632 on the Imported mirror file system X 671, the update is sent 606 by using the Network File System Protocol to the Exported mirror file system X 651 on the Master Mirror Server X 650.

4) The mirror file system X updates two file systems under its management. When the mirror file system X 655 of Master Mirror Server X 650 receives 603 the update through its Exported mirror file system X 651, it does the following:

a. Send 604 the update to the local file system A 652 first. The local file system A 652 then sends 607 the update to its physical device Data A 656.

b. Send 605 the update to its Imported Network File System B 654. The Imported Network File System 654 then sends 609 the update via a Network File System protocol to the Exported Network File system 664 on the Master Mirror Server Y 660.

C. The local file system B 663 of Master Mirror Server Y 660 receives 625 the update from its Exported Network File System B 664 and sends it 624 to the physical device Data B 666.

After the above steps are done, a copy of the update is stored in Data A 656 of Master Mirror Server X 650, and another copy is stored in Data B 666 of Master Mirror Server Y 660.

5. A Client Links Two Imported Mirror File Systems

Figure 10:
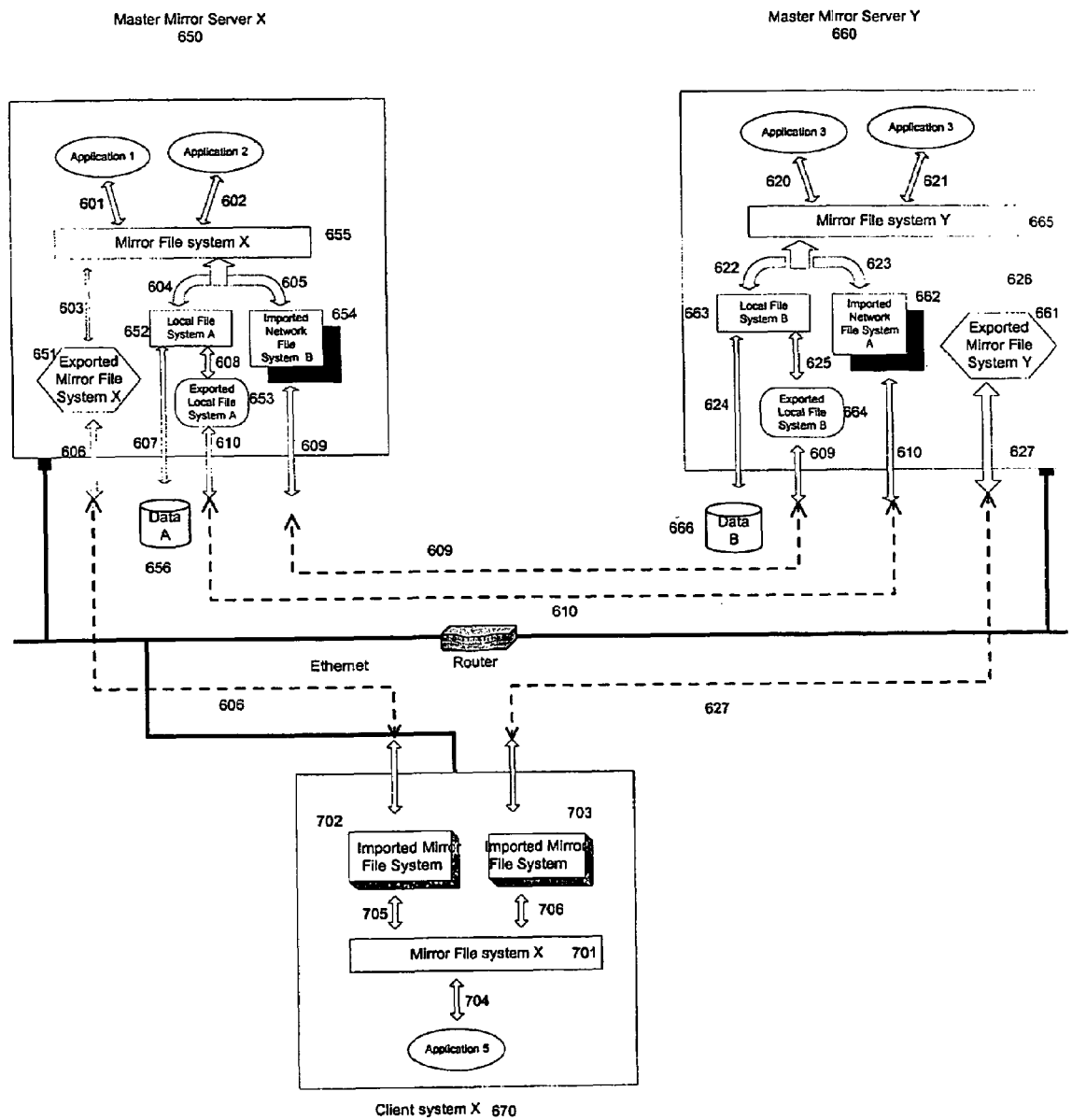
FIG. 10 is an illustration of a sixth embodiment of the invention, in which a client links two imported mirror file systems on a network.

FIG. 10 shows a client that links two imported Mirror Master Servers. The configuration is the combination of configurations illustrated in FIGS. 8 and 9. In this configuration, the MFS mount protocol allows a file system like the Imported mirror file system 702 to be designated as the Active File System and the other File System, the Imported mirror file system 703, to be designated as the Passive File System during the MFS mount. The client only accesses the Active File System until the Active File System becomes unavailable. When the Active File System is not responding to the client's request, the client will failover to the Passive File System and continue its operation.

In this configuration, the client system X 670 imports and links two Mirror File systems, one from Master Mirror Server X and the other from Master Mirror Server Y. Since these two imported Mirror file systems mirror each other on their own Master Mirror Servers X and Y, the Client system X 670 does not need to do any mirroring between these two imported Mirror file systems, all the mirroring is done on the Master Mirror Server X and Y. The configuration is different from the configuration of FIG. 8 in the following respects:

1. The client does not have to do the mirroring between the two imported mirror file systems.
2. The client uses one imported mirror file system as its active file system, the other one as the passive file system.
3. The client only needs to access the active file system to get all needed information at any given time, this includes read and write operations. When the client does a write operation on the active file system, the Master Mirror Server X will carry out the mirroring to the file system on the Master Mirror Server Y.
4. If the active file system becomes unavailable, the client can failover to the passive file system and continue its operation seamlessly.
5. When the active file system is back on line again, all recovery and re-sync are done on the master mirror server, not on the client.

This configuration can provide clients a very smooth, reliable and efficient network operation.

What is claimed is:

1. A virtual file system which provides mirroring and linking of two file systems, comprising:

means for mounting components of each of said two file systems on a single mount point constituting a single root directory for the components of both of said two file systems such that each mounted component of one of said two file systems is linked together with and becomes a mirroring pair with a corresponding mounted component in the other one of said two file systems, each of said two file systems having an application interface data structure constituting a programming interface for management thereof and access thereto; and a virtual file system configured to manage the linking and mirroring of the corresponding mounted components of each of said two file systems, and including a super application interface data structure containing an application interface data structure of said virtual file system, and said application interface data structures of each of said two file systems.

2. The virtual file system of claim 1, wherein said super application interface data structure of said virtual file system contains said application interface data structure of said virtual file system for managing said virtual file system as a whole, and said application interface data structures of each of said mounted file systems for management of said mounted file systems as a whole, respectively, and wherein said super application interface data structure of said virtual file system is configured to serve as a fundamental interface frame structure to link said mounted file systems together as a mirroring pair.

3. The virtual file system of claim 1, wherein said components are one of a file system and a sub-structure of a file system that comprises directories and files.

4. A method for mirroring files and directories between file systems on a computer system or on two computer systems connected to each other via a network, comprising the steps of:

mounting components of each of two file systems on a single mount point constituting a single root directory to create a virtual file system in which each mounted component of one of said two file systems is linked together with a corresponding component in the other one of said two file systems, each of said mounted components being one of a directory and a file;

configuring said virtual file system so that each component of said virtual file system has a super application interface data structure containing an application interface data structure of said component in said virtual file system, an application interface data structure of a linked component in said one of said two file systems, and an application interface data structure of said corresponding linked component in said other one of said two file systems, said application interface data structure of said component in said virtual file system providing a mechanism for managing said component within said virtual file system and the corresponding linked components within said two file systems;

upon receiving a request to perform a write operation on one of said mounted components, using said application interface data structure of said component in said virtual file system to perform the write operation on said linked component in said one of said two file systems and on the corresponding linked component in said other one of said two file systems in real time in response to said request.

5. The method of claim 4 wherein said request designates said one component, on which the write operation is to be performed, by means of a path name that is common to both of said file systems.

6. The method of claim 4 wherein the step of performing said write operation includes the steps of acquiring a lock for each of said one component and said corresponding component of said one component, and inhibiting said write operation until both locks can be acquired.

7. The virtual file system of claim 1, wherein said mounting means mounts a directory of one of said file systems to a directory of the other file system via said single mount point.

8. The virtual file system of claim 1 wherein said single mount point constituting the single directory functions as a single mount point for access to the components of both of said two file systems.

9. The virtual file system of claim 1 wherein the mounted components of each file system are replicated in the other file system.

10. The method of claim 4 wherein said mounting step comprises mounting a directory of one of said file systems to a directory of the other file system via said single mount point.

11. A mirrored file system, comprising:

a first server having a first local file system and a first physical storage device associated therewith;

a second server having a second local file system and a second physical storage device associated therewith; and a client device having a virtual file system which mounts an imported file system from said first server and an imported file system from said second server on a single mount point constituting a single root directory to provide a single point of access for mounted components stored in each of said first and second local file systems, such that each mounted component in one of said first and second local file systems has a corresponding copy in the other one of said first and second local file systems.

12. The mirrored file system of claim 11, wherein said first local file system and said second local file system are each imported into said client device, and said virtual file system mounts components of each of said two imported file systems to a single directory via said single mount point.

13. The mirrored file system of claim 12 wherein said virtual file system contains a super application interface data structure including an application interface data structure of said virtual file system, an application interface data structure of said first local file system, and an application interface data structure of said second local file system, and wherein said virtual file system is configured to access said application interface data structures of said first and second local file systems to manage said first and second local file systems mounted on said single mount point.

14. The mirrored file system of claim 11 wherein each of said first and second servers includes a virtual file system that mounts components of said server's local file system and components of the other server's local file system in a single directory on said single mount point.

15. The mirrored file system of claim 14 wherein the file systems that are imported into said client device comprise the virtual file systems of said first and second servers.

16. The mirrored file system of claim 14 wherein the virtual file system in each server contains a super application interface data structure including an application interface data structure of said virtual file system, an application interface data structure of said first local file system, and an application interface data structure of said second local file system, and wherein said virtual file system in each server is configured to access said application interface data structures of said first and second local file systems to manage said first and second local file systems mounted on said single mount point.

17. The method of claim 4, wherein said virtual file system causes the write operation performed on said one component stored in one of said two file systems to be replicated in the corresponding component of said one component stored in the other one of said two file systems in real time.

18. The mirrored file system of claim 11, wherein said virtual file system is configured to cause an operation performed on a component stored in one of said first and second local file systems to be replicated in the corresponding copy of said component stored in the other one of said first and second local file systems in real time.

* * * * *